Patented July 21, 1931

1,815,781

UNITED STATES PATENT OFFICE

GERHARD KRÖNER, OF COLOGNE-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF FINELY DIVIDED ACTIVE CARBON

No Drawing. Application filed January 22, 1929, Serial No. 334,371, and in Germany January 26, 1928.

The present invention relates to the manufacture of carbon in a finely divided active state by the catalytic decomposition of carbon monoxide or gases containing the same.

It is known that carbon monoxide can be decomposed in contact with iron, nickel, cobalt or oxides thereof at a temperature of about 500° C. according to the equation: $2CO = CO_2 + C$. It is known however, that by passing the carbon monoxide once over a metal catalyst, for example, iron in form of powder at this temperature the decomposition of carbon monoxide is far from being quantitative and when using an iron oxide catalyst only a small portion of the carbon monoxide will be decomposed.

In accordance with the present invention, the manufacture of finely divided carbon in an active state is performed by using as catalysts mixtures of metals of the eighth group of the periodic system with difficulty reducible metal oxides. The metals of the eighth group, especially iron, nickel and cobalt are used in a finely divided and carefully reduced form, as they are obtainable, for instance, by reducing organic salts (oxalates, formates and the like) of these metals by hydrogen. As metal oxides, the following may be mentioned by way of example: magnesium oxide, aluminum oxide, calcium oxide.

When using these mixed catalysts for the decomposition of carbon monoxide, the separation of active carbon in a finely divided state starts at about 250° C., and it is made possible to prepare carbon by these catalysts at temperatures ranging from 250° to 450° C., on a technical scale. When vapors of hydrocarbons such as, for instance, methane, ethane, benzene and the like are mixed with the carbon monoxide or the gases containing carbon monoxide, a carbon is obtained under otherwise similar conditions, which is distinguished by a particularly deep black velvet luster and in general exhibits an increased activity. The hydrocarbon concerned need not necessarily enter into the reaction. The carbon produced according to the process described possesses in all cases active properties, as is shown by its absorption capacity, for example, for benzene vapors.

Furthermore it has also been found that in cases in which the recovery of the catalyst from the soot mixture is desired, a treatment with acids, such as diluted hydrochloric acid, washing and drying has no detrimental effect on the activity and other properties of the carbon. It follows that the catalyst can thus be recovered for re-use, especially if applied without being deposited upon a carrier.

The process can be carried out by passing the carbon monoxide or the gases containing the same over the catalyst. The best conditions of working in view of the velocity of the gas stream, the temperature to be applied and the like varying in wide limits, mainly depends on the catalyst used, but it may be mentioned that a lowering of the temperature generally will improve the quality of the carbon obtained. When the progressive dilution of the catalyst, due to the carbon separated, has reached such a degree that the waste gases still contain considerable amounts of carbon monoxide, it will be advantageous to pass these gases over fresh supplies of contact mass in order to reach a yield as quantitative as possible. The catalyst-soot mixture can then be withdrawn at any desired metal content. If desired, the carbon, thus obtained, can be treated with acids for the removal of the catalyst, washed and dried.

The invention is illustrated by the following example, without being restricted thereto:—

*Example.*—A gas mixture of 78% CO, 12% $CH_4$ and 10% $N_2$ is passed over 1 kg. of a catalyst consisting of 80% Ni and 20% MgO at a temperature of about 300–350° C. After the formation of 14 kg. of active carbon the waste gas contains about 25% CO, which can be decomposed by passing it over a fresh catalyst, whereby an almost quantitative decomposition of the carbon monoxide is rendered possible.

I claim:—

1. In the process of preparing finely divided active carbon, the step which comprises decomposing carbon monoxide by means of a catalyst, composed of at least one metal of the eighth group of the periodic system in a finely divided and carefully reduced form and at least one difficultly reducible metal oxide of the group consisting of magnesium oxide, aluminum oxide and calcium oxide, at a temperature between about 250° and 450° C.

2. In the process of preparing finely divided active carbon, the step which comprises decomposing carbon monoxide by means of a catalyst, being composed of at least one metal of the group consisting of iron, nickel and cobalt in a finely divided and carefully reduced form and at least one difficultly reducible metal oxide of the group consisting of magnesium oxide, aluminum oxide and calcium oxide, at a temperature between about 250° and 450° C.

3. In the process of preparing finely divided active carbon the step which comprises decomposing carbon monoxide by means of a catalyst composed of nickel and magnesium oxide, at a temperature between about 250° and 350° C.

4. In the process of preparing finely divided active carbon the step which comprises decomposing carbon monoxide in admixture with vapors of a hydrocarbon by means of a catalyst composed of at least one metal of the eighth group of the periodic system in a finely divided and carefully reduced form and at least one difficultly reducible metal oxide of the group consisting of magnesium oxide, aluminum oxide and calcium oxide at a temperature between about 250° and 450° C.

5. In the process of preparing finely divided active carbon, the step which comprises decomposing carbon monoxide in admixture with vapors of a hydrocarbon by means of a catalyst composed of at least one metal of the group consisting of iron, nickel and cobalt in a finely divided and carefully reduced form and at least one difficultly reducible metal oxide of the group consisting of magnesium oxide, aluminum oxide and calcium oxide, at a temperature between about 250° and 450° C.

6. In the process of preparing finely divided active carbon, the step which comprises decomposing carbon monoxide in admixture with vapors of a hydrocarbon by means of a catalyst composed of nickel and magnesium oxide at a temperature between about 250° and 350° C.

In testimony whereof I have hereunto set my hand.

GERHARD KRÖNER. [L. S.]